United States Patent [19]

Choi

[11] Patent Number: 4,989,749
[45] Date of Patent: Feb. 5, 1991

[54] PORTABLE LITTER BASKET

[76] Inventor: Kwang S. Choi, 250-13, Sangdo-4-Dong, Seoul, Rep. of Korea, 156-094

[21] Appl. No.: 404,426

[22] Filed: Sep. 8, 1989

[51] Int. Cl.⁵ ................................................ B65D 7/24
[52] U.S. Cl. .................................... 220/401; 220/404; 220/908; 248/97
[58] Field of Search .......................... 220/17, 401, 404; 248/97, 99, 161

[56] References Cited

U.S. PATENT DOCUMENTS

| | | | |
|---|---|---|---|
| 1,308,268 | 7/1919 | Wagner et al. | 220/401 |
| 2,010,789 | 8/1935 | Roesel | 220/401 |
| 3,265,284 | 8/1966 | Tompkins | 220/401 |
| 4,120,417 | 10/1978 | Aquino | 220/401 |
| 4,180,113 | 12/1979 | Liebling | 220/401 |
| 4,188,005 | 2/1980 | Lee | 220/401 |
| 4,646,802 | 3/1987 | Basore et al. | 220/401 |
| 4,921,196 | 5/1990 | Rudko | 220/401 |

Primary Examiner—Joseph Man-Fu Moy
Attorney, Agent, or Firm—Fleit, Jacobson, Cohn, Price, Holman & Stern

[57] ABSTRACT

A portable litter basket is comprising of a bag, a plurality of support members of equal length, and a plurality of brace members. The upper portions of the brace members is slidably joined on the upper portion of the support members, and the lower portion of the brace members is rotatably joined on the lower portion of the support members, so that the breadths between the support members can be controlled by operation of the brace members whereby the support members can stretch the opening of the bag.

16 Claims, 6 Drawing Sheets

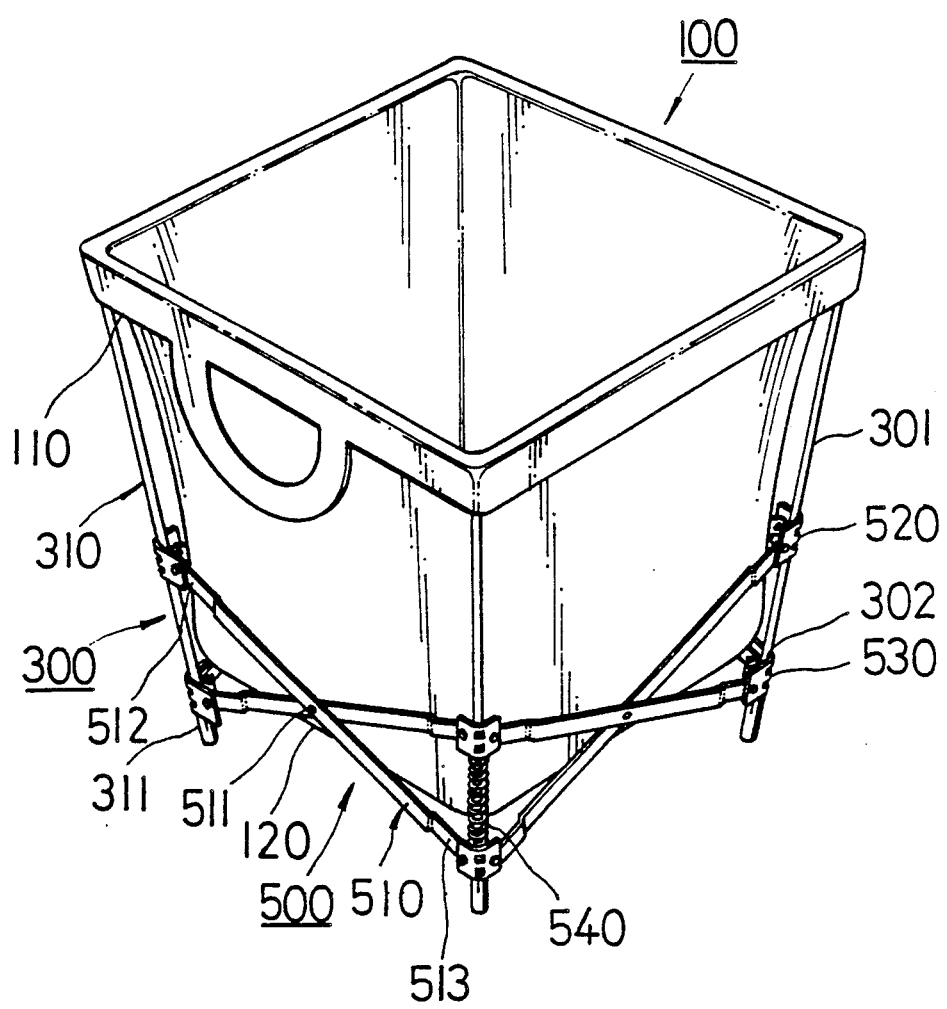

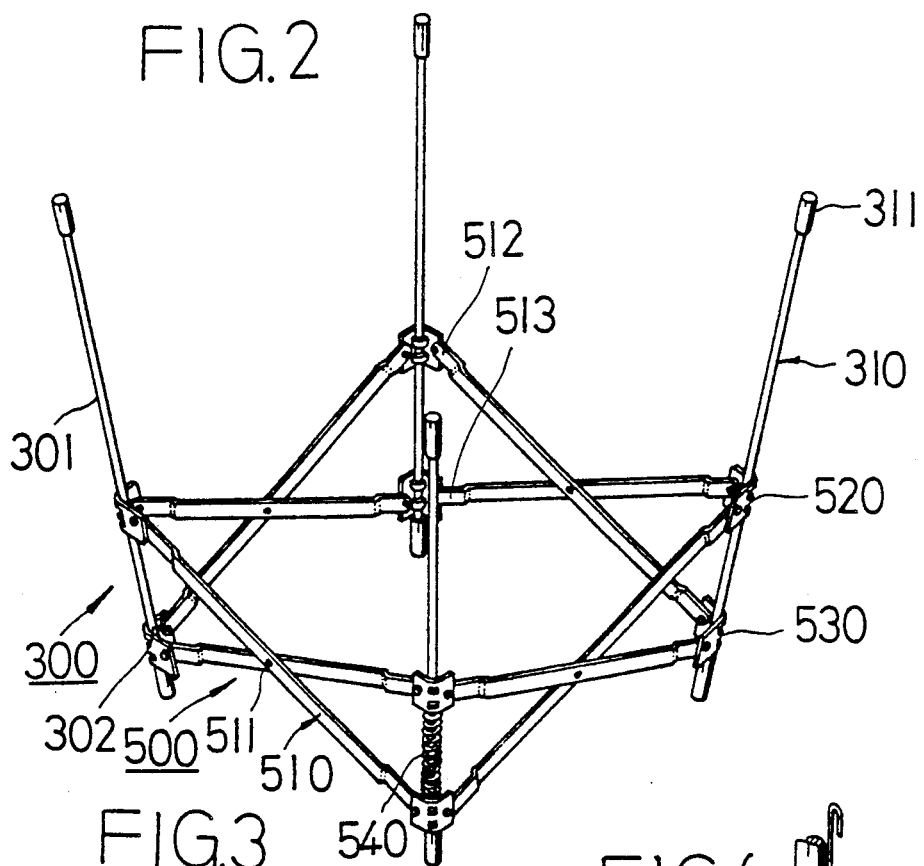
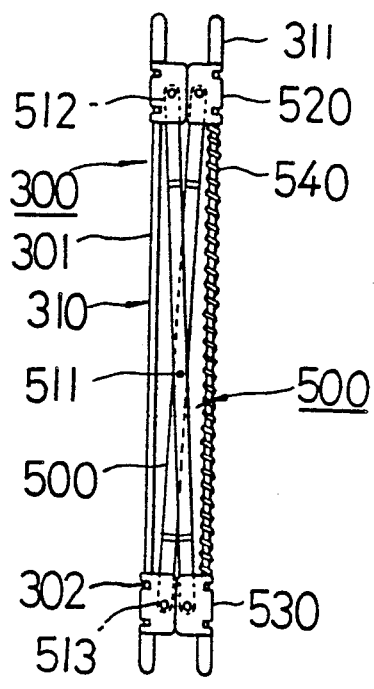
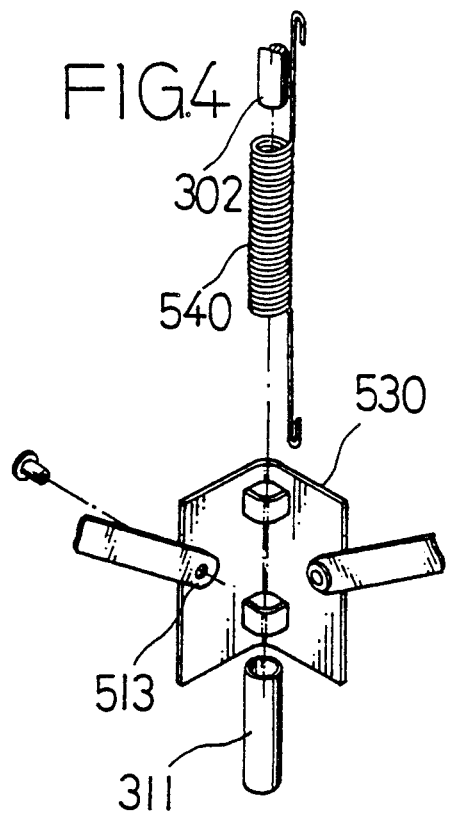

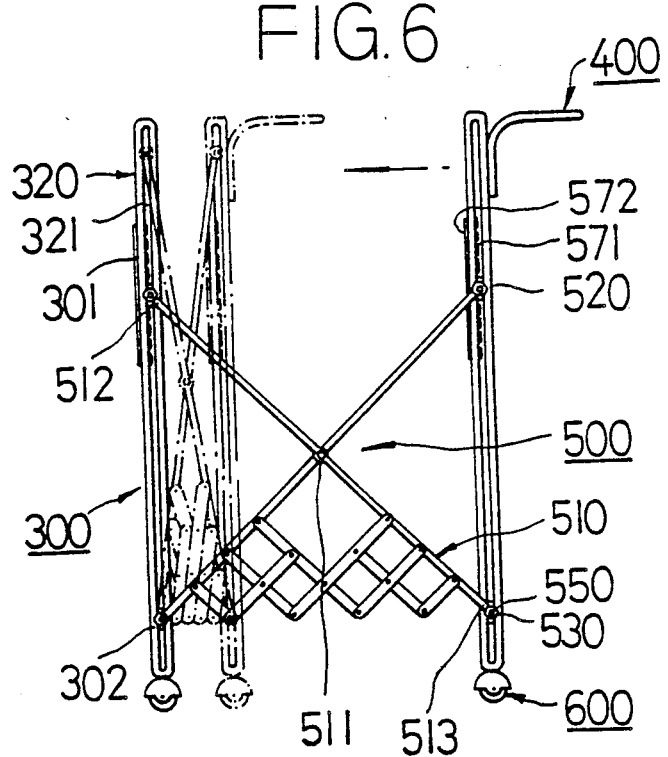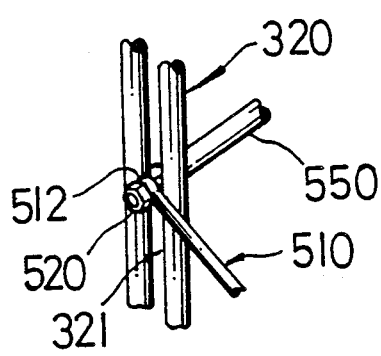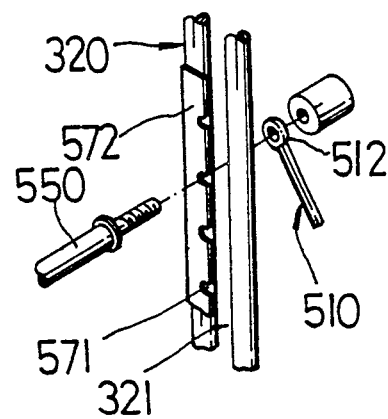

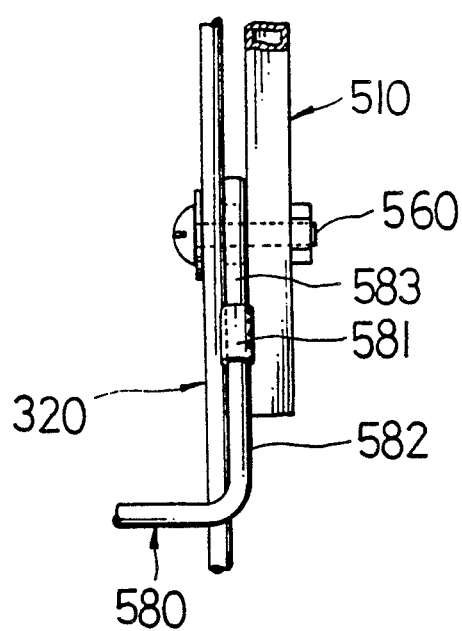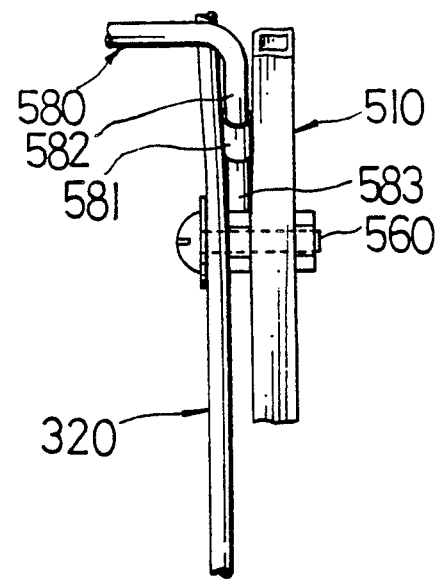

PORTABLE LITTER BASKET

FIELD OF THE INVENTION

This invention relates to a portable litter basket, which is easily collapsible, whereby making it convenient for people to carried with when going to the rest areas such as seaside or mountain resort which are not equipped proper litter baskets.

BACKGROUND OF THE INVENTION

Recently, people have been incresed enormously, who go to rest areas such as seaside resorts or mountain resorts on weekends or holidays. Most of the rest areas are not equipped with litter bin at proper places, whereby such litterings as empty bottles, cans or packages thrown away here and there by lots of people who do not locate any litter bin, pollute natural environment. However some people who have excellent public morals, put into their litterings vynil bags or any other containers carried with, collect them at a proper place in order to prevent polluting natural environment. In this case it is difficult for people to throw litterings into vynil bags, because they can not be erected themselves and not be streched open in their inlets. Accordingly a portable litter basket, which is convenient to carry with and erect a vynyl bag to be streched open at a proper place, would be helpful for people to put litterings into it.

An object of the invention is to provide a portable litter basket, which is convenient for people to carry with, to erect a vynyl bag to be streched open at a proper place, to put into their litterings vynil bags, and collect them at a proper place, whereby preventing the pollution of natural environment.

DESCRIPTION OF DRAWINGS

FIG. 1 shows a perspective view of the first embodiment of the invention.

FIG. 2 shows a perspective view of the frame of said first embodiment except a vynil bag.

FIG. 3 shows the state of said frame being collapsed.

FIG. 4 shows the connection between coil spring and slider or fixer.

FIG. 6 shows a elevational view of the FIG. 5, showing the state of collapsing and streching of the invention.

FIG. 7 shows the connection between brace and connecting rod.

FIG. 8 shows a bend forming a set of grooves affixed to the fence.

FIG. 10 shows the connection between friction rod and brace and fence.

DESCRIPTION OF THE INVENTION

Figure 5:
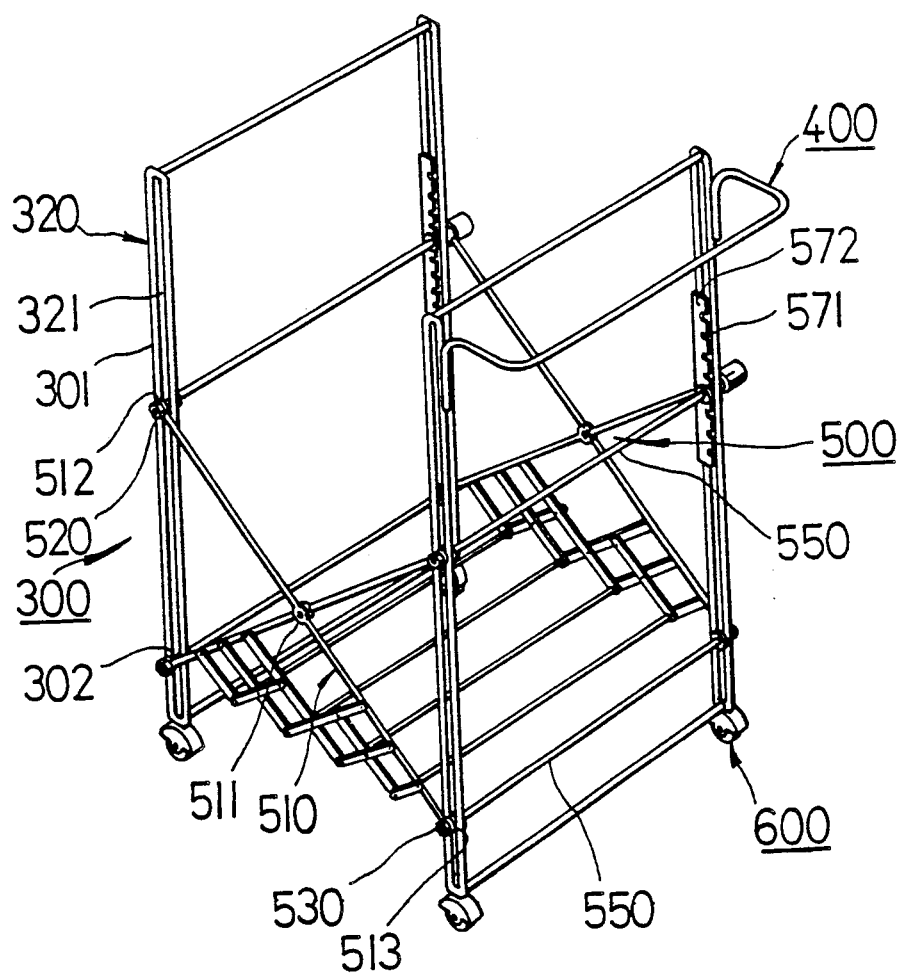
FIG. 5 shows a perspective view of the frame of the second embodiment except a vynil bag.

The invention comprises a vynil bag 100, one side 110 thereof being open, other sides 120, thereof being closed; a plurality of support members 300; a plurality of braces 500 which consist of a pair of elongated bars 510 being pivoted each other on their centers 511; the upper portions 512 of said braces being slidably joined on the upper portions 301 of said support members, and the lower portions 513 of said braces being pivoted on the lower portions 302 of said support members, so that the breadths between said support members be controlled by operation of said braces.

Said vynil bag 100 may be one kind of vynil bag, so long as it has a opening 110 in one side, being closed in other sides 120; but it would be desirable, if it secure a proper space, being holded on said support members 300.

Figure 9:
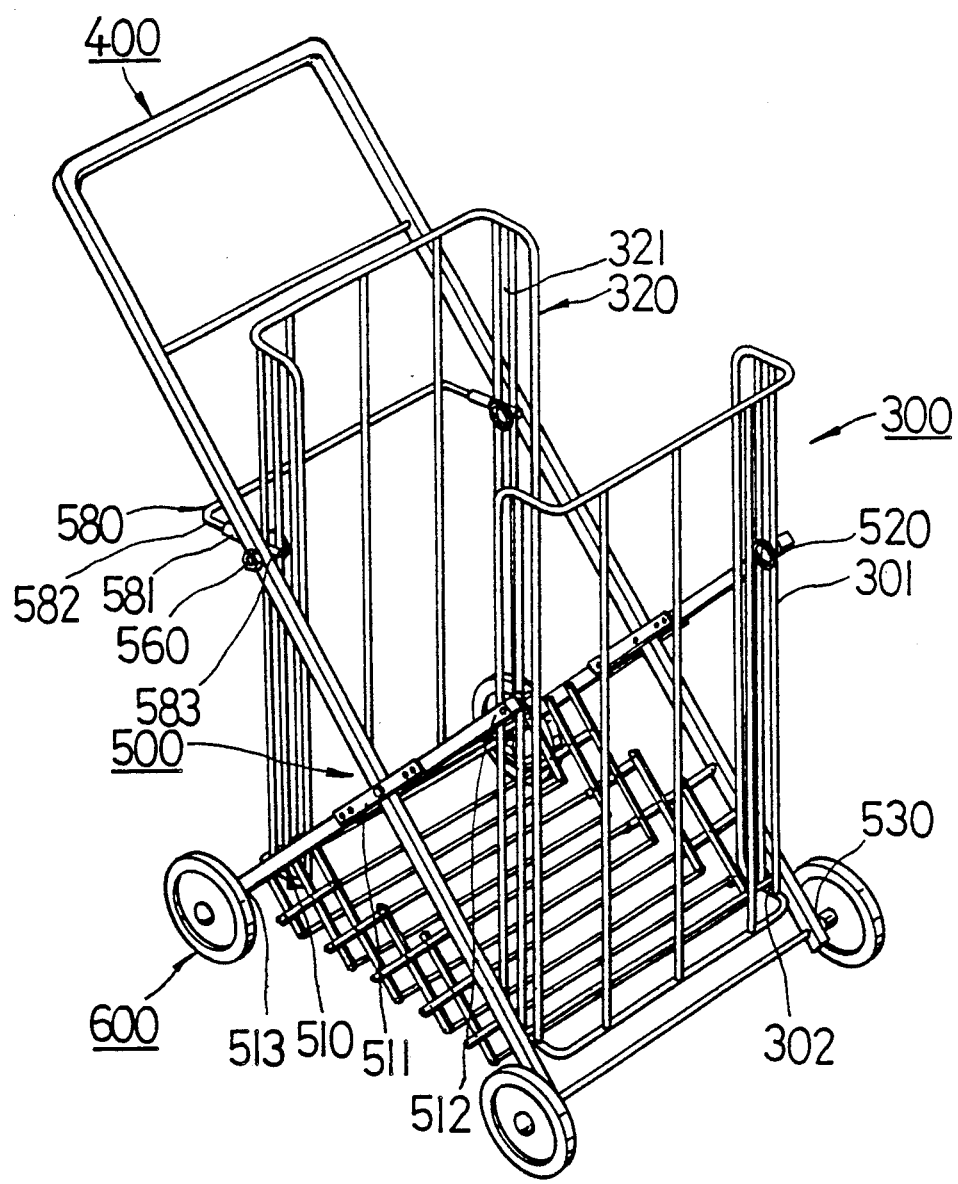
FIG. 9 shows a perspective view of the frame of the third embodiment except a vynil bag.

Said support members 300 may consist of four rods 310 of equal length as shown FIG. 1~4, showing the first embodiment of the invention. In this case it is desirable to cover a set of caps 311 to the end of said rods to protect the surface of said vynil bag 100, said caps are made of rubber or plastics. Said support members 300 may consist of two fences 320 with vertical slots 321 on their side edges as shown FIG. 5~10, showing the second and the third embodiments of the invention.

Said braces 500 consist of a pair of elongated bars 510 being pivoted each other on their centers 511, in the first embodiment in which said support members consist of four rods 310, four pairs of braces are joined to said rods, the upper portions of said bars 510 are pivoted to sliders 520 slidably joined to the upper portions of said rods 310, the lower portions thereof being pivoted fixers 530 fixedly joined to the lower portions of said rods. A coil spring 540 is connected between said slider 520 and said fixer 530 on one of said rods, forcing said slider to be pushed toward said fixer, so that said rods be streched.

In the second and the third emboiments in which said support members consist of two fences 320 with vertical slots 321 on their sides, two paris of braces are joined to said fences, the upper portions of said bars 510 are slidably joined outside the upper portions of said slots 321, the lower portions thereof being joined outside the lower portions of said slots, by rods 550 connecting each pair of braces through said slots or by connecting pins 560.

A set of grooves 571 formed inside the upper portion said slot 321, cluching said connecting rod 550 or pin 560, so that said braces hold the fences to be streched. In an embodiment of the invention, a bend 572 with a set of grooves is affixed to the upper portion of the slot 321. In stead of said grooves, a friction rod 580 may be pivoted between the bars 510 and the fences 320 on the pin 560 as shown in FIG. 10. The portions 581 of the friction rod 580, contacting with the bar 510 and the fence 320 when its rotating, is thicker than other portions 582, 583, so that said braces hold the fences to be streched by friction force.

A handle 400 may be affixed outside the upper portion of said fence, or affixed to the upper ends upwards extended from the upper portions of said bars, a set of wheels 600 may be rotatably mounted under said fences, or on the lower ends downwards extended from the lower portions of said braces for convenience in carriage.

The invention is carried at a proper place, being collapsed as shown by FIG. 6. The opening of a vynil bag is put over the support members. Said vynil bag is streched on the support members streched by sliding of the braces along them. In this case, the braces are slided down and stopped at a proper position by force of coil spring and by resistance of vynil bag as in the first embodiment; by cluching the connecting rod or pin into said groove as in the second embodiment; or by operation of said friction rod as in the third embodiment.

Making said vynil bag upside down, the litter basket is completed.

It should be noted that the invention is a combination of a collapsible frame and a vynil bag streched thereon, the advantages thereof is to help people to erect a vynyl bag to be streched open at a proper place, to put into their litterings vynil bags, and collect them at a proper place, whereby preventing the pollution of natural environment.

Obviously many modifications and variations of the present invention are possible in the light of the above teachings. It is, therefore, to be understood that the scope of the appended claims the invention may be practiced otherwise then as specifically described.

What is claimed is:

1. A portable litter basket comprising:
   a vynil bag, one side thereof being open, other sides thereof being closed;
   a plurality of support members of equal length;
   a plurality of brace members which consist of a pair of elongated bars being rotatably joined each other on their centers;
   the upper portions of said brace members being slidably joined on the upper portion of said support members, and the lower portion of said brace members being rotatably joined on the lower portion of said support members, so that the breadths between said support members be controlled by operation of said brace members;
   whereby support members hold the opening of said vynil bag to be stretched, making it convenient for people to throw litterings into said vynil bag.

2. The portable litter basket of claim 1, wherein said support members consist of four rods; and said brace members consist of four pairs of brace, each upper end of which is rotatably joined to each slider slidably joined to each upper portion of said rods, each lower end of which is rotatably joined to each fixer fixed on each lower portion of said rods.

3. The portable litter basket of claim 2, further including at least a coil spring which elastically joins said slider to said fixer.

4. The portable litter basket of claim 2, further including a set of caps covered to each end of said rods in order to protect the surfaces of the things which contects with.

5. The portable litter basket of claim 4, wherein said set of caps is made of rubber.

6. The portable litter basket of claim 4, wherein said set of caps is made of plastic.

7. The portable litter basket of claim 1, wherein said support members consist of a pair of fences formed with vertical slots on there side edges, to which the upper portions of said brace members are slidably joined and the lower portions of said brace members are rotatably joined.

8. The portable litter basket of claim 7, further including wheels which are rotatably mounted on the lower ends downwards extended from said lower portion for the convenience of carriage.

9. The portable litter basket of claim 7, further including wheels which are rotatably mounted under said panels for the convenience of carriage.

10. The portable litter basket of claim 7, further including stop means which is mounted for preventing said brace members from sliding in said vertical slots.

11. The portable litter basket of claim 10, wherein said stop means is a friction rod which is pivoted between said panel and brace member slidably joined through said slot by a pin.

12. The portable litter basket of claim 10, wherein said stop means is a set of grooves formed inside the upper portion of said slot in which said brace member be inserted to be prevented from sliding.

13. The portable litter basket of claim 7, further including a base holder which consists of a pair of subsidary braces pivoted on the mid-lower portion and a set of base rods connecting the lowest joints of said subsidary braces.

14. The portable litter basket of claim 7, further including a handle for the convenience of carriage.

15. The portable litter basket of claim 14, wherein said handle is fixed outside one of said panels.

16. The portable litter basket of claim 14, wherein said handle is the upper ends upwards extended from said upper portion of said brace members.

* * * * *